C. E. OGDEN.
MEANS FOR CHARGING STORAGE BATTERIES.
APPLICATION FILED JULY 26, 1920.
1,430,107.
Patented Sept. 26, 1922.
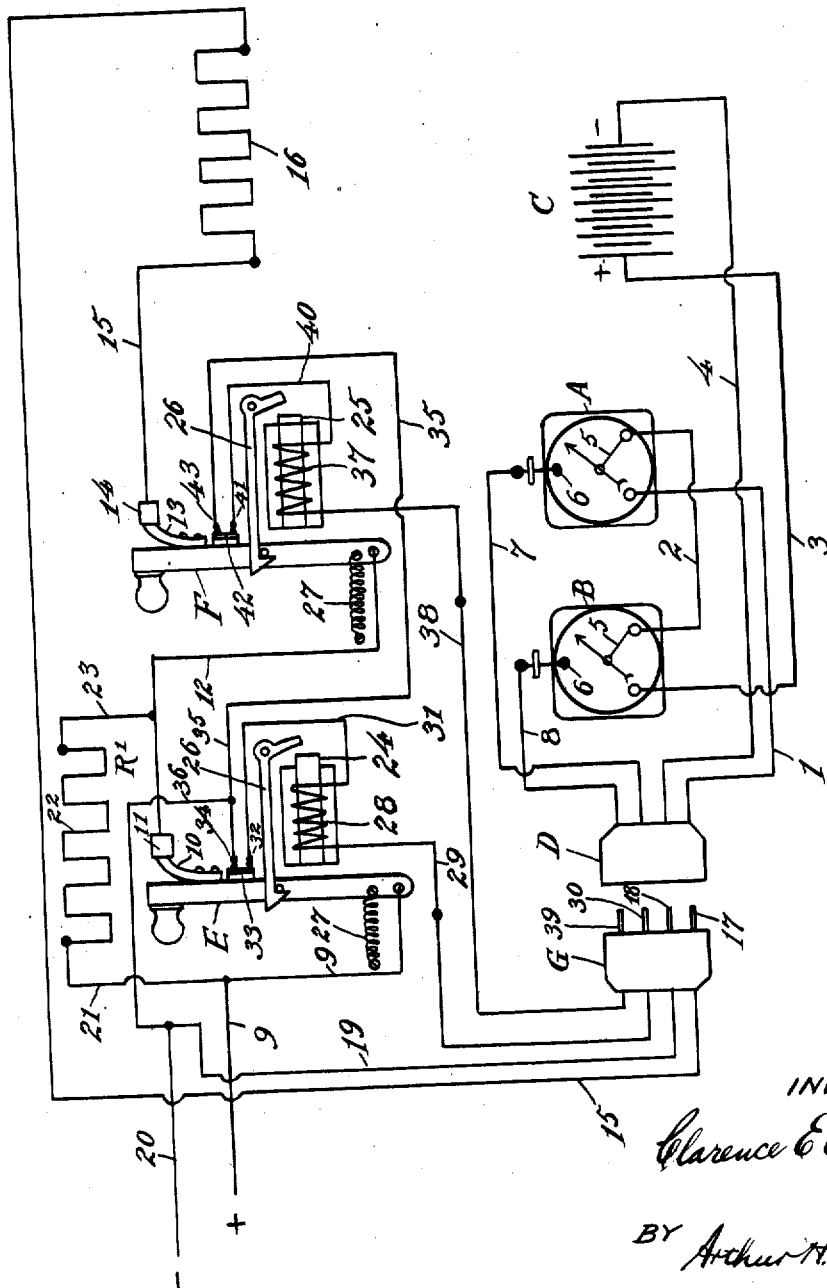
INVENTOR:
Clarence E Ogden
BY Arthur H Ewald
ATTORNEY.

Patented Sept. 26, 1922.

1,430,107

UNITED STATES PATENT OFFICE.

CLARENCE E. OGDEN, OF CINCINNATI, OHIO.

MEANS FOR CHARGING STORAGE BATTERIES.

Application filed July 26, 1920. Serial No. 399,063.

*To all whom it may concern:*

Be it known that I, CLARENCE E. OGDEN, a citizen of the United States, and a resident of Cincinnati, in the county of Hamilton and State of Ohio, have invented certain new and useful Improvements in Means for Charging Storage Batteries, of which the following is a full, clear, and exact description, reference being had to the accompanying drawings, forming a part of this specification.

My invention relates to means for the charging of storage batteries, and has particular reference to the provision of devices for the regulation of the rate at which a battery is charged.

After discharge a storage battery of the lead type may be recharged at high rate until about 60% of the discharge has been returned, after which the charge should proceed at a lower rate in order to prevent excessive gassing and consequent injury to the battery. The principal object of the present invention is to provide means whereby the rate of charge may be automatically regulated by the introduction of additional resistance when approximately 60% of the discharge has been returned, thereby reducing the rate of charge and obviating the damage of charging at an excessive rate during the remainder of the period required fully to recharge the battery.

Further objects of the invention will appear from the following detailed description thereof.

In the drawings, the figure is a diagrammatic view of the invention.

The letters A and B indicate respectively two ampere hour meters, which may be, and preferably are, mounted together in a single case. The meter A is set so that the needle travels approximately 40% slow on discharge and correct on charge. Meter B is set to indicate correct on discharge and to travel 15% slow on charge. The meters, suitably mounted, are in permanent connection with a battery C on a vehicle and with a charging receptacle or socket D also on the vehicle, the connections being as follows, viz: From positive charging circuit socket of receptacle D by wire 1 to meter A; thence by wire 2 to meter B; from meter B by wire 3 to battery C positive, and by wire 4 to the negative charging socket of receptacle D. The needles of the respective meters are electrically connected by means of wires 5 to charging circuit posts in the respective meters. Each of the meters is provided at zero with a contact point 6, the respective points being connected by wires 7 and 8 with individual sockets in receptacle D.

The letters E and F indicate respectively line switches preferably mounted on a charging panel; the positive line 9 is connected with one pole of switch E. The brush 10 of switch E is arranged to make contact with a plate 11, connected by a wire 12 with one pole of switch F. Brush 13 of switch F makes contact with a plate 14, connected by a wire 15 through resistance 16 with the positive point 17 of plug G. The negative point 18 of plug G is connected by wire 19 with the negative line 20. The positive line 9 is also connected by means of a wire 21 with resistance 22, and thence by wire 23 with wire 12.

The switches E and F are of the type generally known as shunt trip circuit breakers and, as diagrammatically illustrated in the drawings, are provided respectively with electromagnets 24 and 25 for releasing triggers 26 and permitting the opening of the respective switches by springs 27. One pole of the coil 28 of magnet 24 is connected by wire 29 with a point 30 on plug G, which point is arranged to make contact in socket of wire 7 of meter A. The other pole of coil 28 is connected by wire 31 with a point 32 arranged to make contact with a plate 33 mounted on the lever of switch E. The plate 33 also makes contact with point 34 which is connected by wires 35 and 36 with the negative line. The plate 33 makes contact with points 32 and 34 when the brush 10 and plate 11 are in contact.

One pole of coil 37 of magnet 25 is connected by wire 38 with a point 39 of plug G, the point 39 making contact in the socket of wire 8 of meter B. The other pole of magnet 37 is connected by wire 40 with a point 41 arranged to contact with a plate 42 on the lever of switch F, which plate also makes contact with point 43 connected by wires 35 and 36 with the negative line 20. The plate 42 makes contact with points 41 and 43 when the brush 13 and plate 14 are in contact.

The operation of the invention is as follows: During discharge of the battery C the needle of meter A has traveled 40% slow, and therefore indicates approximately about 60% only of the actual discharge. The needle of meter B on the other hand has traveled correctly on discharge and therefore stands at a point indicating the actual discharge from the battery. In recharging the battery, the plug G and receptacle D are connected in the usual manner, after which the switches E and F are closed. The charging circuit is then through positive line 9, switches E and F, resistance 16, wire 1, meter A, wire 2, meter B, wire 3, battery C, wires 4 and 19 to negative line 20. During charge the needle of meter A travels at the correct rate to indicate the actual amount of charge. The needle thus reaches zero when the battery is approximately 60% recharged only; at this stage the needle of meter B, traveling 15% slow on charge is in position indicating approximately only 50% of the required recharge. When the needle of meter A reaches zero it contacts with point 6 of said meter and a shunt circuit is thus established from the line 9 as aforesaid through wires 1 and 5, needle of meter A, point 6, wire 7, point 30, wire 29, coil 28, wire 31, plate 33, wires 35 and 36 to negative line 20. The magnet 24 being thus energized by coil 28, trips the trigger 26 and allows the spring 27 to open switch E, both the line circuit through brush 10 and plate 11 and the shunt circuit through coil 28 and plate 33 being opened thereby.

Thereafter the charging circuit is as follows: From line 9, through wire 21, resistance 22, wire 23, wire 12, switch F, resistance 16, and so on as above set forth. The needle of meter B traveling 15% slow on charge, and having still approximately 50% of its total discharge to travel, requires approximately 55% of charge in order to restore the actual remaining 40% of discharge taken from the battery. Thus in order to bring the needle of meter B to zero an actual overcharge of approximately 15%, which is desirable in recharging a battery, in order to take care of wastage during the process, is required. When the needle of meter B makes contact with point 6 of said meter, a shunt circuit is established through coil 37 of magnet 25 as follows: Through wire 1, meter A, wires 2 and 5, needle of meter B, point 6 of said meter, wire 8, point 39 of plug G, wire 38, coil 37, wire 40, plate 42, wires 35 and 36 to negative line 20. The energizing of magnet 25 trips the trigger 26 and opens the line circuit as well as shunt circuit through switch F, thus entirely disconnecting the current.

As will be seen by the arrangement of the meters A and B, together with the other devices and connections described, suitable means are provided whereby the rate of recharge is automatically controlled, and whereby, furthermore, a suitable overcharge is provided. The operation of the several devices being entirely automatic and requiring no mechanical manipulation, is at all times certain and effective, thus eliminating all possibility and danger of injury to the battery during charge.

Having thus full described my invention, what I claim as new and desire to secure by Letters Patent, is:

1. Means for charging storage batteries comprising in combination with a charging circuit and resistance, two ampere hour meters, the first of said meters being set to indicate slow on discharge and correct on charge, means whereby during charge said first meter is arranged when at zero to introduce said resistance into the charging circuit, and means whereby the second meter is arranged on completion of charge to open the line circuit.

2. Means for charging storage batteries comprising in combination with a charging circuit and resistance, two ampere hour meters, the first of said meters being set to indicate slow on discharge and correct on charge, and the second meter being set to indicate correct on discharge and slow on charge, means whereby during charge said first meter is arranged when at zero to introduce said resistance into the charging circuit, and means whereby the second meter is arranged at zero to open said charging circuit.

3. Means for charging storage batteries comprising in combination with a charging circuit, two automatic circuit breaking switches and resistance, two ampere hour meters, the first of said meters being set to indicate slow on discharge and correct on charge, means whereby during charge said first meter is arranged when at zero to open said first switch to introduce said resistance into the charging circuit, and means whereby the second meter is arranged on completion of charge to open said second switch.

4. Means for charging storage batteries comprising in combination with a charging circuit, two automatic circuit breaking switches and resistance, two ampere hour meters, the first of said meters being set to indicate slow on discharge and correct on charge and the second meter being set to indicate correct on discharge and slow on charge, means whereby during charge said first meter is arranged when at zero to open said first switch and introduce said resistance into the charging circuit, and means whereby the second meter is arranged at zero to open the second switch to open said charging circuit.

CLARENCE E. OGDEN.